United States Patent [19]

Templer, Jr.

[11] Patent Number: 5,519,921
[45] Date of Patent: May 28, 1996

[54] MOBILE ROPE CLEAT

[76] Inventor: Joe L. Templer, Jr., 2031 Oak Vista, San Antonio, Tex. 78232

[21] Appl. No.: 403,052

[22] Filed: Mar. 13, 1995

[51] Int. Cl.$^6$ .................................................. F16G 11/00
[52] U.S. Cl. .................................................. 24/130
[58] Field of Search ................................ 24/129 R, 130, 24/129 A, 129 D, 115 H, 115 K

[56] References Cited

U.S. PATENT DOCUMENTS

| | | | |
|---|---|---|---|
| 712,408 | 10/1902 | Priddat | 24/130 |
| 1,249,371 | 12/1917 | Freeberg | 24/130 |
| 2,329,389 | 9/1943 | Bullum | 24/129 R |
| 2,932,072 | 4/1960 | Pruchnow | 24/129 R |
| 3,930,288 | 1/1976 | Black et al. | 24/129 R |
| 4,649,664 | 3/1987 | Mahan | 24/130 X |
| 5,205,687 | 4/1993 | Boyland | 24/130 X |

FOREIGN PATENT DOCUMENTS

| | | | |
|---|---|---|---|
| 101868 | 9/1937 | Australia | 24/129 R |
| 30631 | of 1897 | United Kingdom | 24/130 |

*Primary Examiner*—James R. Brittain

[57] ABSTRACT

When ropes, lines and cords are used to tie down cargo there is a requirement that the slack be removed to create the tautness necessary to totally secure the cargo and that the loose end of the rope, line or cord be absolutely and totally held in place. A device is necessary that is mobile, easy to use and provides the facilities to do both. The device of the present invention is designed to not be permanently attached to another object or structure, but to be temporarily anchored to the rope, line or cord itself for as long as the tie down is required. It also has special hooks designed to be used for leverage to remove the slack from the rope, line or cord prior to securing the loose end.

2 Claims, 4 Drawing Sheets

(SIDE "A")

(SIDE "B")

MOBILE ROPE CLEAT

BACKGROUND OF THE INVENTION

1. Field of the Invention

This invention relates to rope cleats, mooring cleats and similar securing devices employed in material tie downs and the like.

2. Statement of the Prior Art

Much time has been spent devising new fastening devices for ropes cords and lines which, in turn, are used to secure items. Almost all of the fastening devices are permanently mounted or attached to some object. A problem that has not been addressed deals with providing a mobile device (one not permanently attached to some object) whose primary purpose is to facilitate the removal of slack from a rope, line or cord that is being used to tie down cargo, and to secure the loose end of the same rope, line or cord as the final stage of tying down the cargo with a requirement that security of said loose end needs to occur simply and without slippage to prevent loss of tautness after the slack has been removed. Likewise, the unfastening effort needs to be simple and quick.

Hereinafter the word "rope" will be used to denote such elongated articles as ropes, cords or lines. Previously proposed cleats have been embodied in numerous and varied configurations. Many types may be found in the following list of U.S. Patents:

| Patent No. | Patentee | Date Filed/Granted |
| --- | --- | --- |
| D.209,330 | Coderre | F-Nov. 21, 1967 |
| 816,827 | Skene | F-Nov. 03, 1905 |
| 942,009 | Mueller | F-Feb. 17, 1909 |
| 962,675 | Sims | F-Jan. 02, 1909 |
| 966,297 | Bart | F-June 07, 1909 |
| 986,014 | Krenzke | F-Dec. 22, 1908 |
| 1,011,726 | Berry | F-Mar. 21, 1911 |
| 1,251,778 | Humble | F-Mar. 28, 1917 |
| 1,531,746 | Fort | F-May 22, 1923 |
| 1,968,935 | Fisher | F-Oct. 12, 1933 |
| 1,986,994 | Armacost | F-Nov. 01, 1933 |
| 2,510,862 | Buehl | F-Nov. 17, 1945 |
| 2,677,863 | St. John | G-May 11, 1954 |
| 2,836,141 | Brydon | G-Mar. 27, 1958 |
| 2,873,499 | Bartholomew | G-Feb. 17, 1959 |
| 3,090,343 | Ronsheim | G-May 21, 1963 |
| 3,125,978 | Faul | G-Mar. 24, 1964 |
| 3,126,858 | Rosinski | G-Mar. 31, 1964 |
| 3,233,934 | Osbom | G-Feb. 08, 1966 |
| 3,574,900 | Emery | G-Apr. 13, 1971 |
| 3,948,203 | Matthews | G-Apr, 06, 1976 |
| 4,084,532 | Feder | G-Apr. 18, 1978 |
| 4,173,194 | McLaughlin | G-Nov. 06, 1979 |
| 4,373,463 | Beaudette | G-Feb. 15, 1983 |

While all of the above patents disclose various fasteners or cleats useful for interacting with ropes, all of them are designed to be permanently mounted or bolted down to a larger object to be operative and none easily facilitate the removal of slack from the rope just prior to securing its loose end.

U.S. Pat. No. 556,485 granted to Wilson in March of 1896 discloses a rope-grip comprising a straight shank having an eye at one end (to be attached to the end of the rope), U-shaped prongs located one at or near each end of the shank, and one or more intermediate short prongs, all of which said prongs being disposed upon and projecting from the same side of the shank and having their points of juncture with the body or shank in longitudinal alignment, the said prongs being arranged to project alternately in reverse directions, substantially as and for the purpose specified.

U.S. Pat. No. 3,988,810 granted to Emery in November of 1976 discloses a cleat in which both ends of the cord can be held fast, thus enabling the cleat to be used in the manner of a buckle on wearing apparel, although it is not limited to use on wearing apparel. One end of the cord may be removably held in the cleat and the other end relatively permanently engaged in the cleat. Means are provided -whereby the cord may be passed around an object and then both ends secured in the cleat.

None of the above provides a rope fastening device that can be temporarily anchored to the rope itself, that easily facilitates the removal of slack from the rope prior to securing it (after it has served its purpose of securing cargo ), and at the same time offers an easy, fast and totally secure method for fastening the loose end of the rope.

SUMMARY OF THE INVENTION

It is the object of the present invention to provide a rope fastening device that is not permanently attached to a larger object and is simple and fast to secure by attaching it (the device) anywhere along the originating length of a rope, which originating end has been secured in some manner to another object and whose lose end is to be secured.

Another object of the invention is to provide special hooks to facilitate the removal of slack from the rope prior to securing the loose end of the rope.

Another object of the invention is to provide cleats affording a simple, positive anchor without involving knots or tie down procedures.

A final object of the invention is to provide a device that can provide a quick release of the rope In accordance with the above stated objects the device of the present invention is comprised of a symmetrical spine, where each side possesses hooks and cleats. Each side of the symmetrical spine has at least three parallel, equally spaced-apart jam cleats mounted side-by-side on the spine, with adjacent open ends facing in opposite directions; and at least one pair of "end" hooks, one each on the spine adjacent and outside the first and last jam cleat. Each jam cleat converges with the spine to form an acute angle.

The hooks and cleats on one side of the spine are to be used to easily and temporarily attach the device anywhere along the originating end of a rope, which end has been otherwise secured to an object. This stations (positions) the device to subsequently be used to remove the slack from the loose end of the rope and then to secure the same loose end of the rope.

The cleat device also comprises a second, special set of hooks, both on the same longitudinal side of the symmetrical spine, one towards each end of the device, to be used to loop the rope over to create tautness by removing the slack by pulling on the rope before the loose end of the rope is restrained. The hooks and cleats on the other side of the spine are used to secure the loose end of the rope after having first looped the rope over the nearest special hook and pulled or drawn to remove undesired slack from the rope.

On either side of the spine the rope forms an acute angle with respect to each of the jam cleats and remains totally secure in a jammed relationship with respect to the outer jam cleats. Thusly, the rope is restrained without lose of tautness.

IN THE DRAWINGS

FIG. 1 an isometric view of the present invention taken from a top, side angle showing the symmetry of FIG. 2 is a top view showing the originating end of a rope (secured to some stationary object and intended to hold down cargo), the present invention which uses the rope itself as an anchor and the terminating end of the rope which has been looped over the nearest special hook to pull the slack out of the rope and then laced through the end hooks and jam cleats to be secured.

DESCRIPTION OF PREFERRED EMBODIMENTS

The rope fastening device of the present invention 1 as seen in FIG. 1 through 4 includes a spine 2 with two special upward hooks 5A and 5B on top of and at each end of said spine 2 facing one another. On either side of the spine 2 are three parallel, equally spaced-apart jam cleats 4A thru 4F mounted side-by-side, with the adjacent open ends facing in opposite directions. Also on each side of the spine 2 are two end hooks 3A thru 3D, one on each end of the spine 2, outside the first and last jam cleats 4A thru 4F, facing away from the cleats and downward.

Figure 1:
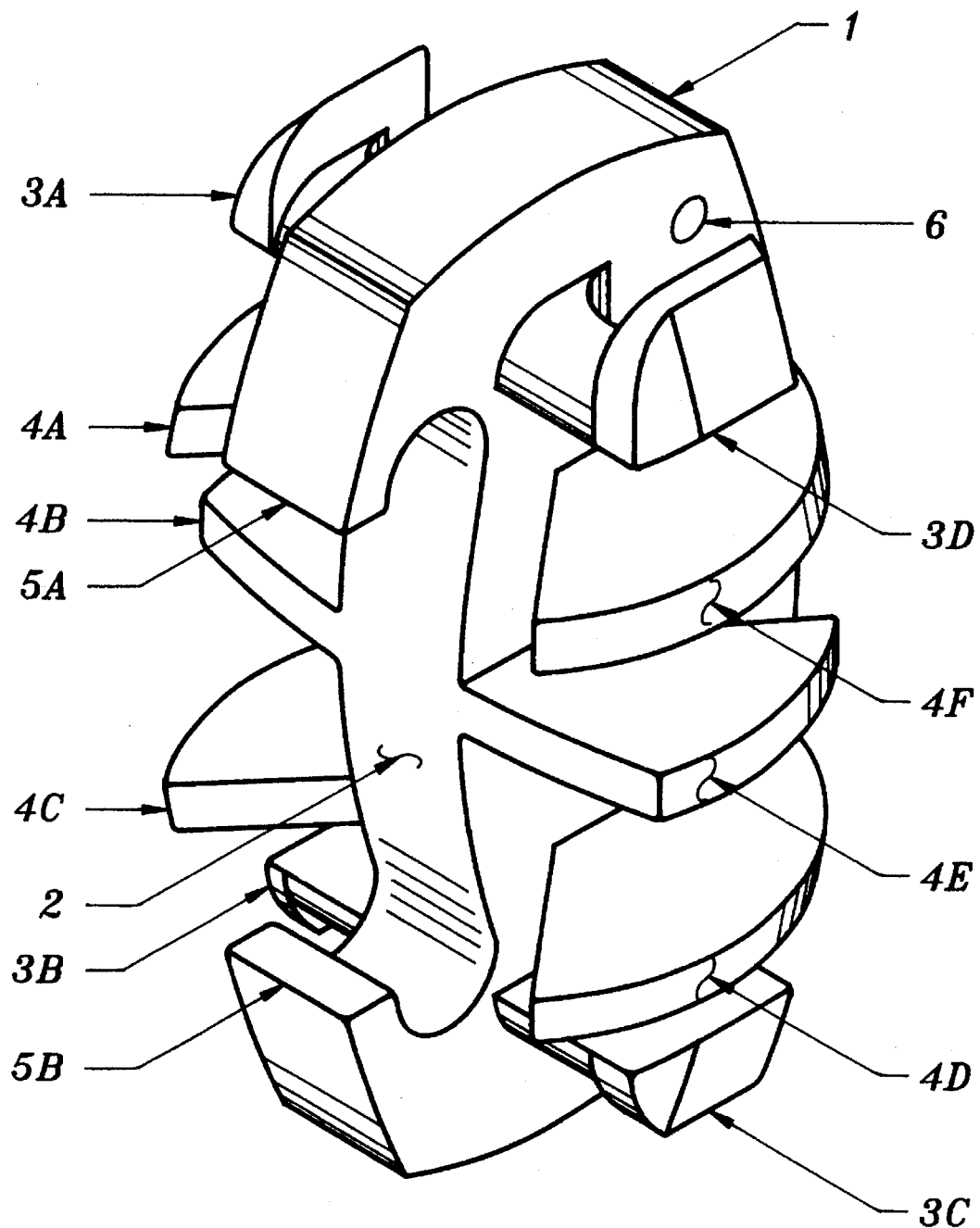
Figure 2:
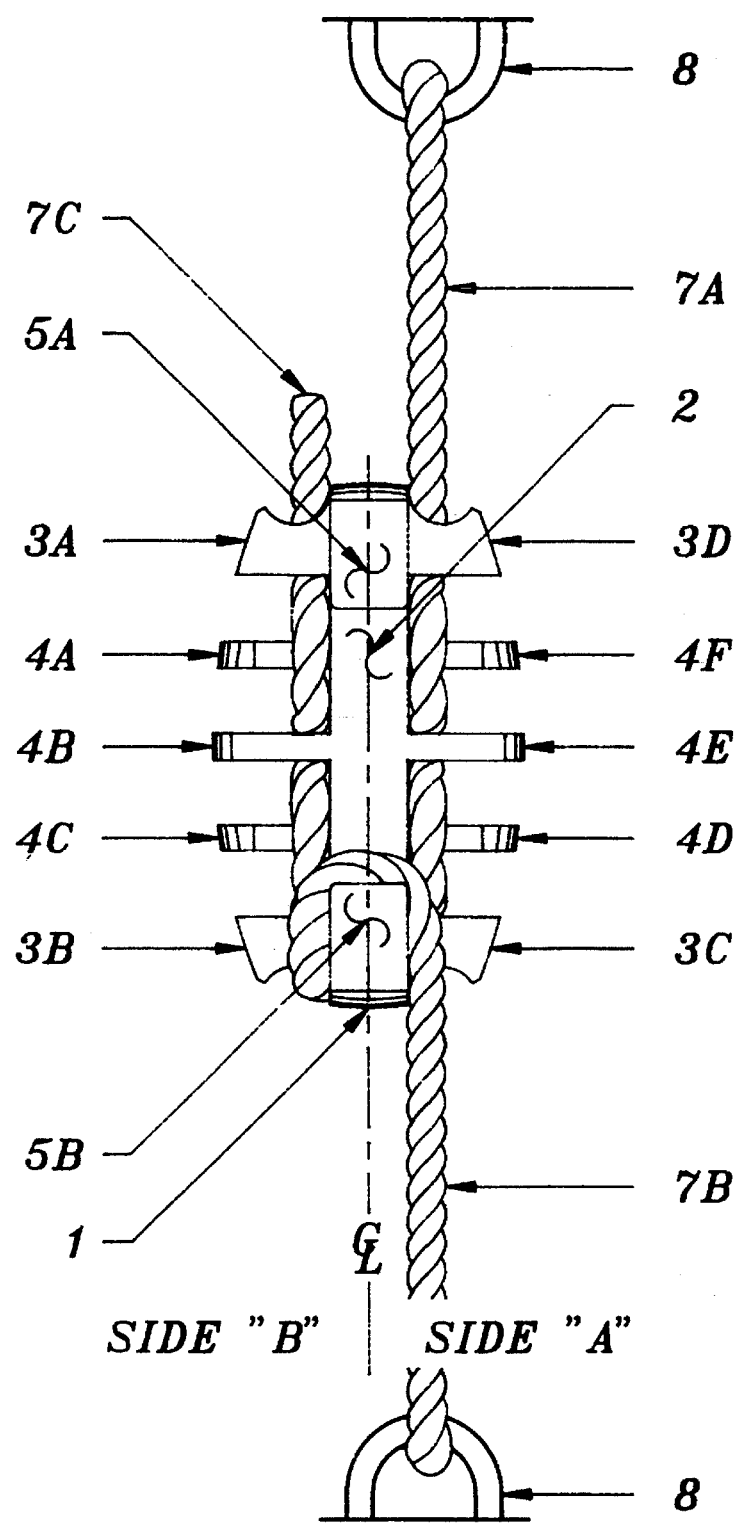

As shown in FIG. 1 & 2 the device of the present invention 1 is cylindrical and symmetrical in shape, one side being identical to the other.

As shown in FIG. 2, at a view from the top of the device 1, one half of the device (SIDE A) is being used to anchor the device 1 to the originating end of the rope 7A while the other half (SIDE B) is used to secure the loose end of the rope 7C.

Figure 3:
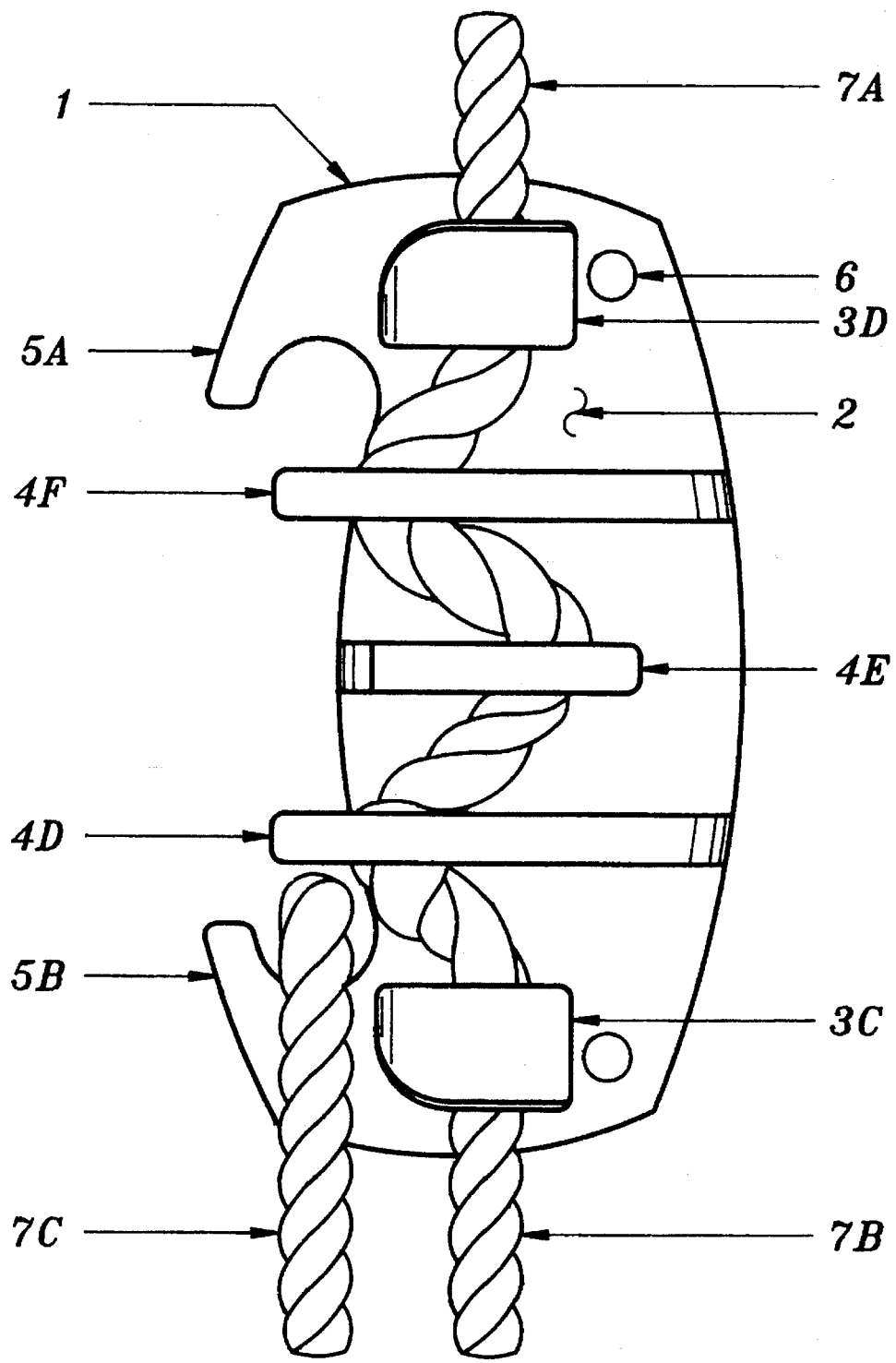
FIG. 3 is a side view of the device showing the originating end of a rope laced amongst the end hooks and jam cleats on one side of the device; the rope itself having thus become the anchor for the device.

FIG. 3 represents SIDE A of the symmetrical device 1 which, for illustrative purposes, is the side chosen to anchor the device 1 to the originating end of the rope 7A, (which will utlimately be secured by SIDE B of the device 1). The rope 7A (whose originating end is secured to some stationary object 8 [as shown of FIG. 2] and which is used to hold cargo in place) becomes the anchor to the present invention 1 by being laced under the first end hook 3D, around each of the three jam cleats 4D thru 4F and finally under the second end hook 3C on SIDE A of the device of the present invention 1.

Figure 4:
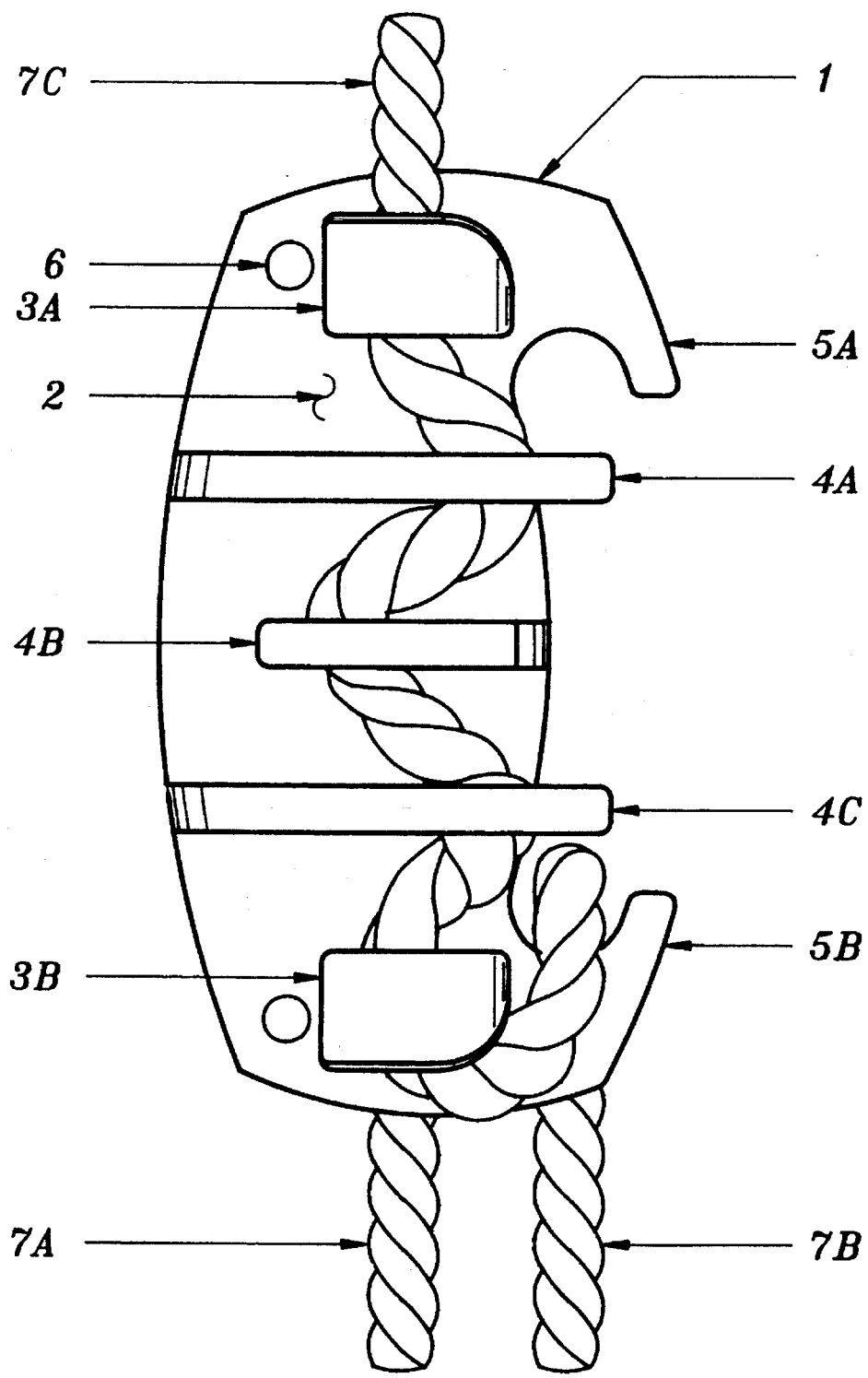
FIG. 4 is a view of the other side of the device with the terminating end of a rope having been looped over the nearest special hook (where the rope was pulled upon to remove all slack) and then laced amongst the second set of end hooks and jam cleats to be secured.

As shown in FIG. 4, SIDE B of the symmetrical device 1 secures the loose end of the rope 7C. When the rope concludes its job of being wrapped around and/or over the cargo it is to hold in place and is ready to be secured, SIDE B of the present invention 1 comes into play by having the slack end of the rope 7B looped over the nearest special hook 5B and pulled away from the device of the present invention 1 to remove slack from the rope, then laced under the nearest end hook 3B, around each of the three jam cleats 4A thru 4C and finally under the farthest end hook 3A. The four end hooks 3A thru 3D hold the rope such that it will not dislodge from the six jam cleats 4A thru 4F. To release the rope, merely reverse the process.

The device 1 of the present invention can be stored by using one of the holes 6 at the spine of the special hooks 5A & 5B (as shown in FIG. 3 & 4) to hang the device 1 when it is not in use. The use of string or wire through the holes 6 can create a hanging apparatus to store the device 1 of the present invention.

It should be apparent from FIG. 2 that the device 1 of the present invention, being symmetrical, can be anchored to a rope on either of its SIDES (A or B) with the end of a rope 7C (seen in FIG. 2) having its slack removed using the nearest special hook 5A or 5B and then being secured on the remaining side. It will be understood that the specific details of the mobile rope cleat may be altered from the preferred embodiment of the invention illustrated without departing from the spirit of the invention.

I claim:

1. A cleat device for restraining a rope, said cleat device comprising of a first and second half and a spine running longitudinally between each half, wherein said spine comprises a first and second hook, one at each end of the spine, and wherein each half of the cleat device has a plurality of at least three parallel, equally spaced-apart, side-by-side jam cleats, with adjacent open ends facing in opposite directions converging on the spine to form an acute angle and two pairs of end hooks, one pair on each half of said cleat device adjacent and outside the first and last jam cleat whereby:

A. one half of the device is used to temporarily anchor itself at any point along the rope whose originating end has been secured to another object or structure; and, B. the other half of the device is used to secure the remaining, loose end of the rope after having been previously looped over either the first or second hook and pulled upon to remove the slack.

2. The cleat device of claim 1 comprising two holes on its spine to facilitate hanging the device when not in use.

* * * * *